W. A. CRAWFORD.
Apparatus for Controlling Way-Cocks of Water-Pipes by Electricity.
No. 159,394. Patented Feb. 2, 1875.
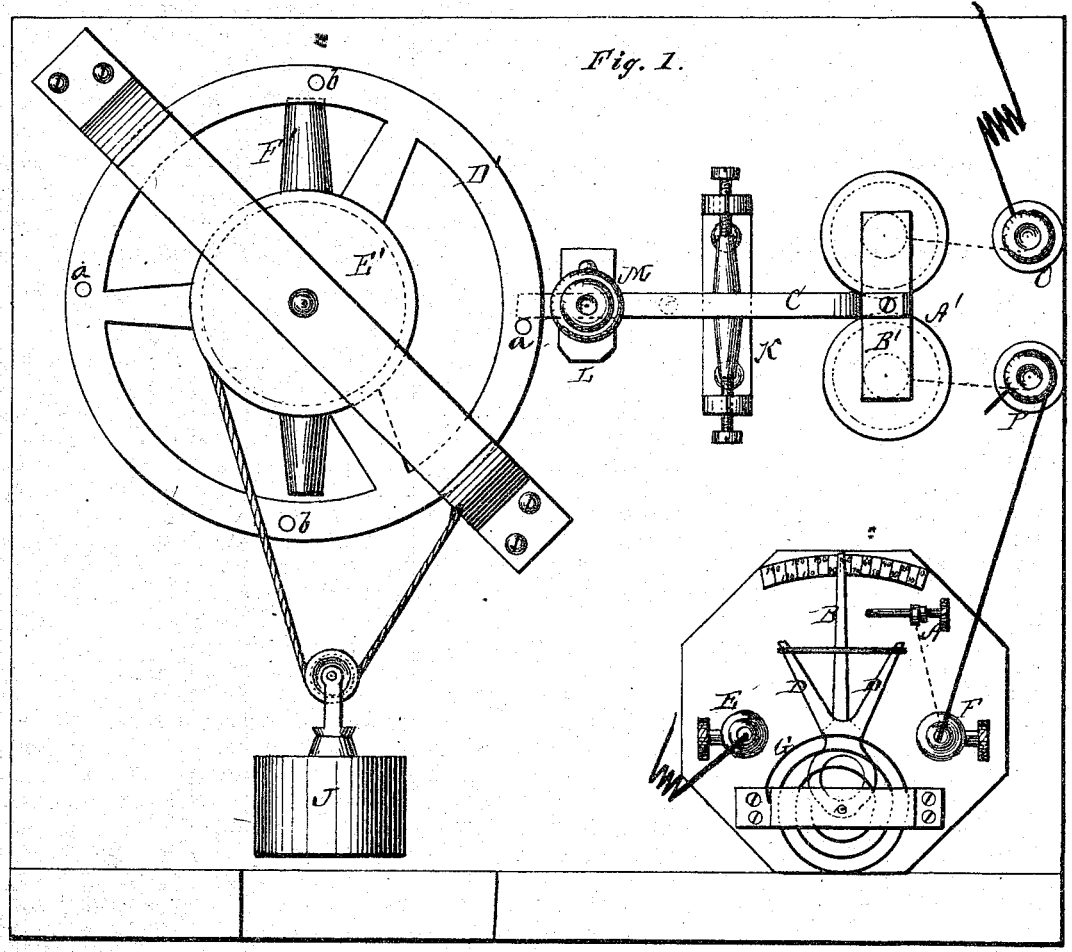
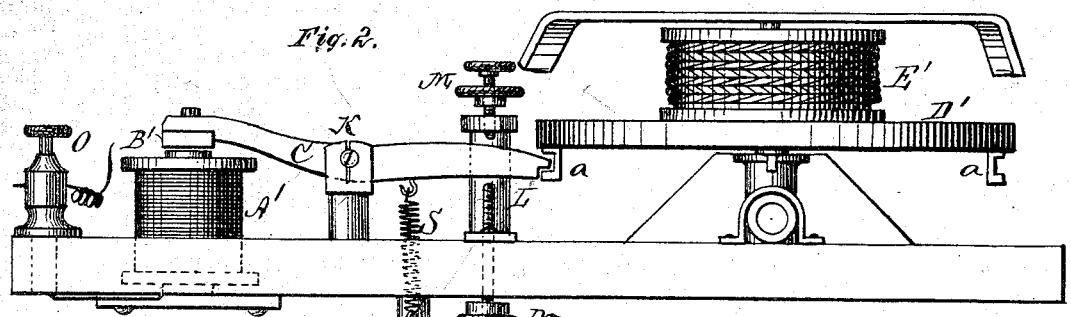
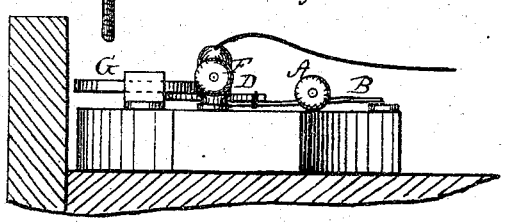

UNITED STATES PATENT OFFICE.

WITSIUS A. CRAWFORD, OF TERRE HAUTE, INDIANA.

IMPROVEMENT IN APPARATUS FOR CONTROLLING WAY-COCKS OF WATER-PIPES BY ELECTRICITY.

Specification forming part of Letters Patent No. 159,394, dated February 2, 1875; application filed May 6, 1874.

*To all whom it may concern:*

Be it known that I, W. A. CRAWFORD, of Terre Haute, in the county of Vigo and State of Indiana, have invented certain new and useful Improvements in Means of Preventing Pipe from Bursting; and I do hereby declare that the following is a full, clear, and exact description thereof, reference being had to the accompanying drawings, and to the letters of reference marked thereon, which form part of this specification.

The object of my invention is to protect the water-pipes in dwelling-houses, stores, and manufactories from bursting by the freezing of their contents; and this is accomplished automatically by the combination of a suitably-constructed metallic thermometer, a constant galvanic battery, and an electro-magnet, to the armature of which is attached a lever, which works in conjunction with a wheel, to which is keyed the plug of a one to two way cock, as circumstances may require, the wheel being revolved by a weight attached to the drum of the same, or a spring contained therein, as will be hereinafter more fully set forth.

In order to enable others skilled in the art to which my invention appertains to make and use the same, I will now proceed to describe its construction and operation, referring to the annexed drawing, in which—

Figure 1 is a side elevation of front view of my invention. Fig. 2 is a plan view of the same, and Fig. 3 is a side view of the metallic thermometer.

The metallic thermometer depends for its action upon the difference of contraction and expansion of two different metals. I have used zinc and steel, as preferable, in the shape of two flat bands, one placed on the other, and secured together with solder in the shape of a spiral, G, the outside end of said spiral being stationary, and the inside end riveted to the axis of a pointer, B D, which is so constructed as to admit of motion in the lower part, D, while the upper end, B, is in contact with the adjustable screw A; the purpose of the thermometer being to open and close an electric circuit, the pointer B D being connected metallically with the binding-post E, and the adjustable screw A being connected metallically with the binding-post F. B' is the armature, attached to one end of the pivoted lever C, the other end of said lever operating against stops $a\,a$ and $b\,b$ on a wheel, D', this wheel being connected to the shaft of the cock F', and revolved by means of a weight, J, suspended on a cord wound around said drum, or by a spring arranged within the same.

With the adjustable screw A set at about 40° Fahrenheit, and the galvanic battery properly connected with the thermometer and electro-magnet A' by insulated wire, the electric circuit will be completed on the temperature decreasing to that degree by the pointer B D coming in contact with the adjustable screw A, thereby causing the electro-magnet A' to attract the armature B', and operating the lever C, connected therewith, throwing said lever into position to allow the wheel D' to make one-fourth of a revolution, which will open the cock F' into the waste-pipe, allowing the water in the supply-pipes to run through into the waste-pipe.

The thermometer is to be placed in the coldest place in the house, or adjusted so as to close the circuit before the temperature decreases to the freezing-point at any place in the house; consequently it must not be placed near any source of temporary heat.

The lever C has its fulcrum at K, and has a rest at L, under the end opposite the armature B', on which it slides freely. Two set-screws, M N, are arranged in the rest L, to regulate the play of the lever.

One end of the lever C extends just back of the wheel D', and engages with one of two kinds of stops or projections extending out from the inside of the wheel, according to the position of said lever.

When the electric circuit is completed, which depresses the armature B', the lever C will disengage itself with the long stop, $a$, through the notch or opening in the side of the same, as shown in Fig. 2, and the spring or weight on the drum E' being wound up, the wheel D' will make one-fourth of a revolution, and the lever will engage with one of the short stops, $b$, in which position the cock F' is always open into the waste-pipe, and closed to the main supply-pipe, if it should be a two-way cock; but if water is taken from a tank, the cock at the tank should be arranged to close at the same time the lower one opened by a proper connection of the two magnets with the battery and thermometer; and when the electric circuit is broken, and the armature B' resumes its normal position by the tension of the spring S, the lever C will then clear the short stop, b, and the wheel D' will then make one-fourth of a revolution more, when the said lever will engage with the next long stop, a, in which position the cock F' is closed to the waste-pipe and open to the main supply-pipe, in case it is a two-way cock; if not, the arrangement would be to open the supply and close the waste-cock at the same time.

In the thermometer a hair-spring should be arranged underneath the coil G, and connected with the pointer B D, so as to take up any slack in the connection of the parts.

The thermometer and electro-magnet are electrically connected in the following manner: One of the binding-posts E F of the thermometer and one of the binding-posts O P of the electro-magnet should be directly connected together. The two remaining posts should be connected to the two poles of the galvanic battery, provided it is the two-way-cock system; but if, as is the case in water being taken from a tank, there is another electro-magnet to be operated, which should be brought into the circuit by connecting as follows: One pole of the battery should be connected by insulated wire to one of the binding-posts of one of the electro-magnets, and the other pole of the battery should be connected in like manner with one binding-post of the other electro-magnet, and the two remaining posts of the electro-magnets should be connected by insulated wires with the two binding-posts of the metallic thermometer, respectively.

Having thus fully described my invention, what I claim as new, and desire to secure by Letters Patent, is—

The combination, with the plug of a way-cock, and means for rotating the same, of a metallic thermometer, a galvanic battery, an electro-magnet, wheel, lever, and stops, all constructed and arranged to operate substantially as and for the purpose set forth.

In testimony that I claim the foregoing as my own I affix my signature in presence of two witnesses.

WITSIUS A. CRAWFORD.

Witnesses:
HENRY H. BOUDINOT,
JAMES D. BROWN.